May 2, 1933.  H. W. GILBERT ET AL  1,906,570
CHAIN CONNECTING MEANS
Filed Nov. 8, 1929
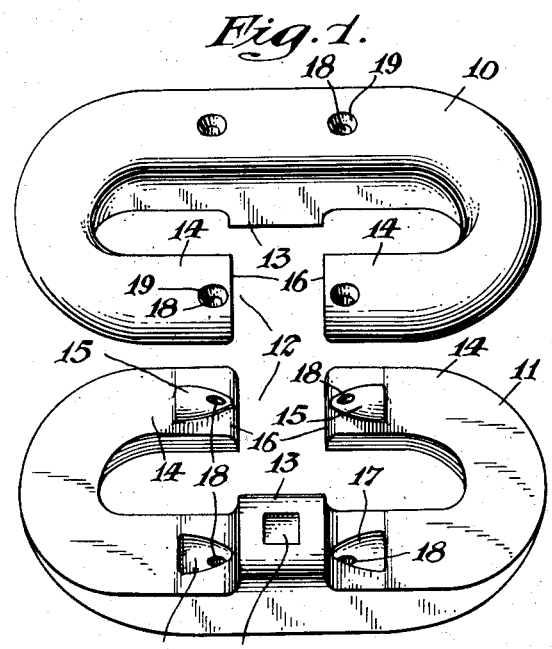
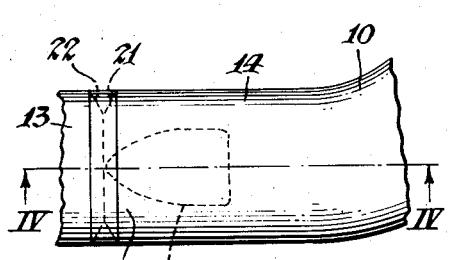
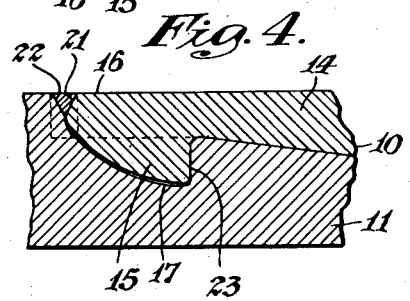
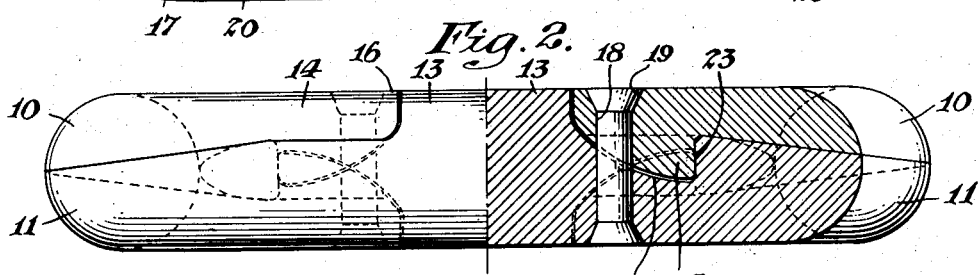
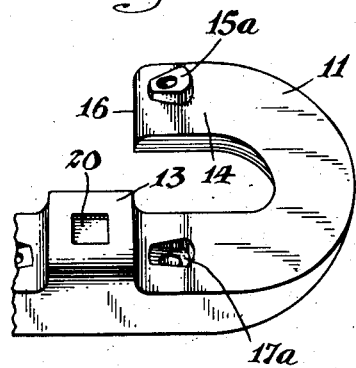
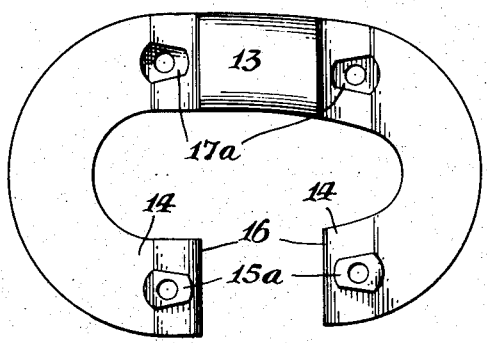
Inventors:
Howard W. Gilbert
By their Attorney Clifford A. Dray
Clarence A. Kerr Patented May 2, 1933

1,906,570

UNITED STATES PATENT OFFICE

HOWARD W. GILBERT, OF SHAKER HEIGHTS, AND CLIFFORD A. DRAY, OF CLEVELAND, OHIO, ASSIGNORS TO NATIONAL MALLEABLE & STEEL CASTINGS COMPANY, OF CLEVELAND, OHIO, A CORPORATION OF OHIO

CHAIN CONNECTING MEANS

Application filed November 8, 1929. Serial No. 405,610.

Our invention relates to chains, such as anchor chains and the like, and particularly to means for joining together a plurality of sections or shots of chain to form a continuous whole, either in the first instance or as a repair in case of the breaking of a link.

The present method of effecting such a connection involves the use of a shackle with removable pin. Due to the large size of the shackle, made necessary by considerations of strength, and due to the necessity of using several other designs of links, which are placed between the shackle and the A links of the chain in order that the pitch, or distance between consecutive bearing surfaces, of the chain will not be made irregular, and for other purposes well known to the art, difficulties are encountered in so joining adjacent shots of chain that the chain as a whole may be run over the "wildcat" or hoisting drum without the necessity for slowing the latter when each joint is reached, in order to avoid injury to the drum. Also, the present method of joining chain, as before mentioned, necessitates the use of several types of links, in addition to the shackle, which increases the expense of the chain, since the chain manufacturer must develop patterns and make castings for these various types of links.

The foregoing difficulties may be obviated by the use of a joining link which will conform to the strength requirements while being of dimensions similar to those of the ordinary A links of the chain. However, prior to our invention, such links, in order to meet the usual break tests have been made of expensive metals, and have been forged rather than cast. Our invention resides in so designing a joining link that, when cast out of metal similar to that used in the remaining links of the chain, or other relatively inexpensive metal, it will possess sufficient strength to pass all of the required tests.

Referring to the drawing, Fig. 1 is a perspective view of the two main component members of our joining links; Fig. 2 is an edge view of the assembled link, partly in elevation and partly in section on a vertical plane through one of the rivet holes; Fig. 3 is a fractional elevation illustrating a modification of our invention; Fig. 4 is a section along the line IV—IV of Fig. 3; Fig. 5 is a fractional perspective view of another modification of our invention; Fig. 6 is a plan view of a further modification of our invention.

Referring more particularly to the drawing, it will be seen that the upper and lower link members, 10 and 11, are identical in form and construction and are so designed that they may be fitted together to form a complete link. Each of said members is cast in the shape of an oval, with a portion of one of its sides left open as at 12, to permit the entry of the end links of the portions of chains to be joined. When assembled, the open portion 12 of each of the link members 10 and 11 is filled by the outwardly projecting portion 13 of the opposite link member. The prongs 14 of the link members are tapered toward their extremities, as may be more clearly seen in Fig. 2. Each prong bears a lug 15 near its outer extremity 16, which lugs are adapted to engage in the depressions 17 of the opposite link member. Rivet holes 18 are positioned in each of the several lugs 15 and depressions 17, the rivet holes 18 being countersunk as indicated at 19. The link elements may be formed with a shallow depression 20, which may contain raised figures, indicating the size of chain for which the link is adapted.

Particular attention is directed to the shape of the lugs 15 and their corresponding depressions 17. The lugs 15 are tapered downwardly toward the ends of the prongs 14, and are also tapered inwardly, on each side, in the same direction. This design has been found to furnish the required resistance to shearing stress and at the same time to reduce, as far as possible, the size of the depressions 17, thus allowing the maximum amount of metal to be cast into the link member adjacent the depressions 17, resulting in the maximum strength attainable at these points in the link member.

In making use of our improved joining link it is only necessary to insert the ends of chain to be joined through the openings 12 in the link members 10 and 11, after which the latter members are fitted together in interlocking relation and riveted together through the rivet holes 18.

In the modified design illustrated in Figs. 3 and 4, the rivet holes 18 are omitted, and the joining is effected by means of welding. In this case the extremity 16 of the prong 14 is beveled as at 21 (Fig. 3), and the edge of the projecting portion 13 is likewise beveled as at 22. The groove thus formed extends across the face of the link and down the side thereof to a distance equal to the depth of the prong 14 at its extremity. Thus it is seen that when the groove is filled with welding metal, the weld serves to secure the prong end 16 on three sides. The lugs and depressions formed on the link members in this case are similar to those used in the first embodiment of our invention, except that the rivet holes 18 are omitted.

Fig. 5 illustrates the use of lugs 15a and depressions 17a of a design differing somewhat from that of lugs 15 and depressions 17. The modified design also tapers downwardly and inwardly toward the prong end 16, but instead of having a continuous curved surface, with the exception of the rear vertical surface 23, as in Fig. 3, the modified design includes plane surfaces at the top and sides of the lug, and curved surfaces front and rear, this design being developed from a cylinder. The important feature, which is common to both designs, is the inward and downward taper toward the prong end 16, providing a relatively large bearing surface, resistant to shearing stress, with a relatively small mass of metal.

The modification of our invention illustrated in Fig. 6 is adapted to joining a length of chain to another length of chain or other object, an anchor, for example, which may be formed of material having a larger diameter than that of the chain to which it is to be joined. In such case, the two link members are formed, as shown in Fig. 6, with a greater internal diameter at one end than at the other, these dimensions being suited to the articles to be joined, as must also be the width of the opening 12.

It is to be understood that the terms which we have employed in the foregoing specification are terms of description and not of limitation, and we do not limit our invention to the exact form shown, but we realize that other modifications may be adopted and equivalent constructions used without departing from the spirit of our invention.

What we claim is:

1. A joining link comprising a pair of link elements, each having an opening in one side thereof for the introduction of the members to be joined, said opening being adapted to be closed by a projecting portion of the opposing member, and means for securing the two elements in interlocking relation, said means consisting of cooperating lugs and depressions of varying cross-section and connecting members positioned at points near the planes of least cross-sectional area of said lugs.

2. A joining link comprising a pair of link elements, each of which has an opening in one side, the portions of the element adjacent said opening being tapered from a relatively thin cross-section adjacent said opening to a relatively thick cross-section adjacent the mid-portion of the opposite side, said mid-portion of the side opposite the opening being of the full thickness of the link, the cross-section of said link element being reduced abruptly to form shoulders a short distance on each side of the said mid-portion, and means, consisting of cooperating lugs and depressions on said elements and members passing through said lugs on one of said elements and the adjacent metal on the other element, for securing the two elements in interlocking relation.

3. A joining link comprising a link element having an opening in one side for the introduction of the members to be joined, and an element coacting therewith to form a closed link, one of said elements having lugs formed thereon, said lugs being tapered so as to have a wider cross-section at the end away from the lateral axis of said element and a smaller cross-section at the end toward the lateral axis of said element, depressions being formed in the said other element, for receiving the said lugs, said elements being secured together at points near the planes of least cross-sectional area of said lugs.

4. In a joining link, the combination of a pair of link elements adapted to be secured in overlapping relation, each of said elements having lugs formed thereon and depressions formed therein to receive the lugs formed on the opposing element, said lugs and depressions being so formed as to have a larger cross-section away from the lateral axis of said element and a smaller cross-section toward the lateral axis of said element, and connecting means positioned at points near the planes of least cross-sectional area of said lugs.

5. In a joining link, the combination of a pair of link elements adapted to be secured in overlapping relation, each of said elements having lugs formed thereon and depressions formed therein to receive the lugs formed on the opposing element, said lugs being tapered downward on the upper surfaces thereof, and inward on the side surfaces thereof, toward the lateral axis of the link element on which said lugs are formed, the said depressions being correspondingly formed to receive said lugs, and connecting members passing through said lugs and the metal adjacent thereto at points near the planes of least cross-sectional area of said lugs.

6. In a joining link, the combination of a pair of link elements adapted to be secured in overlapping relation, each of said elements having lugs formed therein, each said lug being formed with a vertical plane surface on the end thereof away from the lateral axis of the link element, the remainder of the said lug having a continuous curved surface, the said lug having its greatest cross-sectional area coincident with the said vertical plane surface, the said depressions being correspondingly formed to receive said lugs, and connecting members passing through each said lug and the metal adjacent thereto at a point in the portion of said lug nearest the lateral axis of said element.

7. A joining link comprising a pair of link elements, each such element having lugs formed thereon and depressions formed therein to receive the lugs formed on the opposing element, each said lug being formed with inclined plane surfaces at the top and sides thereof, and curved surfaces at the ends thereof, said inclined plane surfaces diminishing in breadth toward the lateral axis of said link element, said lugs and the link portions opposite thereto being recessed for connecting means, said recesses being positioned at least as near to the narrower ends of the lugs and depressions as to the broader ends thereof.

8. A joining link comprising similar link elements each having an opening in one side for the introduction of the members to be joined, said elements co-acting to form a closed link, lugs formed on one of said elements and recesses for engaging the lugs formed on the other element, said lugs being tapered so as to have a larger cross section at the end away from the lateral axis of said element and a smaller section at the end toward the lateral axis of said element, said elements being secured together at points near the planes of least cross sectional area of said lugs.

In testimony whereof, we have signed our names to this specification this 23rd day of October, 1929.

HOWARD W. GILBERT.
CLIFFORD A. DRAY.